(12) United States Patent
Hozumi

(10) Patent No.: US 10,529,991 B2
(45) Date of Patent: Jan. 7, 2020

(54) METHOD FOR PRODUCING COMPOSITE CATHODE ACTIVE MATERIAL AND COMPOSITE CATHODE ACTIVE MATERIAL

(71) Applicant: TOYOTA JIDOSHA KABUSHIKI KAISHA, Toyota-shi, Aichi-ken (JP)

(72) Inventor: Masato Hozumi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 15/675,903

(22) Filed: Aug. 14, 2017

(65) Prior Publication Data

US 2018/0069243 A1 Mar. 8, 2018

(30) Foreign Application Priority Data

Sep. 6, 2016 (JP) .................................. 2016-173716

(51) Int. Cl.
| | | |
|---|---|---|
| *H01M 4/00* | (2006.01) | |
| *H01M 4/62* | (2006.01) | |
| *H01M 4/04* | (2006.01) | |
| *H01M 4/131* | (2010.01) | |
| *H01M 4/36* | (2006.01) | |
| *H01M 4/505* | (2010.01) | |
| *H01M 4/525* | (2010.01) | |

(52) U.S. Cl.
CPC ......... *H01M 4/628* (2013.01); *H01M 4/0471* (2013.01); *H01M 4/131* (2013.01); *H01M 4/366* (2013.01); *H01M 4/505* (2013.01); *H01M 4/525* (2013.01)

(58) Field of Classification Search
CPC .... H01M 4/0471; H01M 4/131; H01M 4/628; H01M 4/505; H01M 4/525
See application file for complete search history.

(56) References Cited

U.S. PATENT DOCUMENTS

| | | | |
|---|---|---|---|
| 2009/0305135 A1* | 12/2009 | Shi .......................... | B82Y 30/00 429/217 |
| 2013/0040193 A1 | 2/2013 | Tsuchida et al. | |
| 2014/0170494 A1* | 6/2014 | Paulsen .................. | C01B 33/32 429/223 |
| 2016/0043395 A1 | 2/2016 | Kawakami et al. | |
| 2016/0268586 A1 | 9/2016 | Kawakami et al. | |

FOREIGN PATENT DOCUMENTS

| | | |
|---|---|---|
| JP | 2011-233246 A | 11/2011 |
| JP | 2013-127945 A | 6/2013 |
| JP | 2014-130774 A | 7/2014 |
| JP | 2016-039052 A | 3/2016 |
| JP | 2016-170942 A | 9/2016 |

\* cited by examiner

*Primary Examiner* — Cynthia H Kelly
*Assistant Examiner* — Monique M Wills
(74) *Attorney, Agent, or Firm* — Oliff PLC

(57) ABSTRACT

Provided in the present disclosure is a method for producing a composite cathode active material with low reaction resistance. The method comprises: a coating step of, with a Li ion conductive oxide, coating a cathode active material that is a spinel type oxide including at least a Mn having a valence of +4 to obtain a coated cathode active material; and a heat treating step of heat treating the coated cathode active material to obtain a composite cathode active material; wherein a valence of the Mn in the cathode active material is lower than a valence of the Mn in the cathode active material before coating, and a valence of the Mn is increased by the heat treating.

15 Claims, 1 Drawing Sheet

METHOD FOR PRODUCING COMPOSITE CATHODE ACTIVE MATERIAL AND COMPOSITE CATHODE ACTIVE MATERIAL

TECHNICAL FIELD

The present disclosure relates to a producing method for a composite cathode active material with low reaction resistance and the composite cathode active material.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently drawn attention from the viewpoint of a high energy density among various kinds of batteries.

In the field of lithium batteries, conventionally, the interface of electrode active materials has been focused and the attempts to improve the performance of lithium batteries have been made; for example, a technique to coat an active material with a Li-containing compound has been considered. Patent Literature 1 discloses a technique to form a reaction suppressing part comprising, for example, a polyanion structure containing compound (such as $Li_3PO_4$—$Li_4SiO_4$) in a cathode active material that contains a transition metal (such as $LiCoO_2$), using a sol-gel method. Also, Patent Literature 2 discloses a method for producing a lithium cathode active material comprising a coating part including a Li element, a P element, and Mn derived from a P element and a cathode active material on a surface of an oxide cathode active material including Mn, wherein in an interface of the cathode active material and the coating part, Mn/P is 1 or more; and the coating part is formed by a sputtering method using $Li_3PO_4$ as a coating material.

CITATION LIST

Patent Literatures

Patent Literature 1; Japanese Patent Application Laid-Open (JP-A) No. 2011-233246
Patent Literature 2; JP-A No. 2016-039052

SUMMARY OF DISCLOSURE

Technical Problem

As a cathode active material, usage of a spinel type oxide including at least a Mn having a valence of +4 has been considered. If a cathode active material that is the spinel type oxide is coated with a Li-containing oxide, the reaction resistance of the battery may not be sufficiently reduced in some cases. The present disclosure has been made in view of the actual circumstances, and a main object thereof is to provide a method for producing a composite cathode active material with low reaction resistance and the composite cathode active material.

Solution to Problem

To achieve the object, the present disclosure provides a method for producing a composite cathode active material, the method comprising: a coating step of, with a Li ion conductive oxide, coating a cathode active material that is a spinel type oxide including at least a Mn having a valence of +4 to obtain a coated cathode active material; and a heat treating step of heat treating the coated cathode active material to obtain a composite cathode active material; wherein a valence of the Mn in the coated cathode active material is lower than a valence of the Mn in the cathode active material before coating; and a valence of the Mn is increased by the heat treating.

According to the present disclosure, the coated active material with decreased valence of the Mn in the coating step is subjected to the heat treating, so that a composite cathode active material with increased valence of the Mn may be obtained. Accordingly, a composite cathode active material with lower reaction resistance may be obtained.

In the disclosure, in an XAFS measurement, when a rate of a spectrum intensity I of 641.5 eV ($Mn^{3+}$) with respect to a spectrum intensity I of 643 eV ($Mn^{4+}$) is regarded as $I(Mn^{3+})/I(Mn^{4+})$, in the heat treating step, the valence of the Mn may be increased so that a value of $I(Mn^{3+})/I(Mn^{4+})$ in the composite cathode active material becomes 1.07 times or less of a value of $I(Mn^{3+})/I(Mn^{4+})$ in the cathode active material before coating.

Also, in the disclosure, in an XAFS measurement, when a rate of a spectrum intensity I of 639.5 eV ($Mn^{2+}$) with respect to a spectrum intensity I of 643 eV ($Mn^{4+}$) is regarded as $I(Mn^{2+})/I(Mn^{4+})$, in the heat treating step, the valence of the Mn may be increased so that a value of $I(Mn^{2+})/I(Mn^{4+})$ in the composite cathode active material becomes 1.31 times or less of a value of $I(Mn^{2+})/I(Mn^{4+})$ in the cathode active material before coating.

In the disclosure, the Li ion conductive oxide may have a polyanion structure.

In the disclosure, a heat treating temperature in the heat treating step may be 400° C. or more.

In the disclosure, the cathode active material may be represented by $LiMe_xMn_{2-x}O_4$, in which Me is at least one of Ni, Co, Cu, Fe, and Cr, and $0 \le x < 2$.

In the disclosure, the cathode active material may be $LiNi_{0.5}Mn_{1.5}O_4$, $LiCoMnO_4$, $LiCu_{0.5}Mn_{1.5}O_4$, $LiFeMnO_4$, or $LiCrMnO_4$.

The present disclosure provides a composite cathode active material comprising a cathode active material that is a spinel type oxide including at least a Mn having a valence of +4, and a Li ion conductive oxide that coats the cathode active material; wherein in an XAFS measurement, when a rate of a spectrum intensity I of 641.5 eV ($Mn^{3+}$) and a rate of a spectrum intensity I of 639.5 eV ($Mn^{2+}$) with respect to a spectrum intensity I of 643 eV ($Mn^{4+}$) are regarded as $I(Mn^{3+})/I(Mn^{4+})$ and $I(Mn^{2+})/I(Mn^{4+})$ respectively, the $I(Mn^{3+})/I(Mn^{4+})$ is in a range of 0.40 or more to 0.50 or less, and the $I(Mn^{2+})/I(Mn^{4+})$ in a range of 0.08 or more to 0.12 or less.

According to the present disclosure, the $I(Mn^{3+})/I(Mn^{4+})$ and the $I(Mn^{2+})/I(Mn^{4+})$ are in the above described value range, so as to allow a composite cathode active material with lower reaction resistance.

In the disclosure, the cathode active material may be represented by $LiMe_xMn_{2-x}O_4$, in which Me is at least one of Ni, Co, Cu, Fe, and Cr, and $0 \le x < 2$.

In the disclosure, the cathode active material may be $LiNi_{0.5}Mn_{1.5}O_4$, $LiCoMnO_4$, $LiCu_{0.5}Mn_{1.5}O_4$, $LiFeMnO_4$, or $LiCrMnO_4$.

Advantageous Effects of Disclosure

In the present disclosure, a composite cathode active material with low reaction resistance may be obtained.

DESCRIPTION OF EMBODIMENTS

The method for producing a composite cathode active material and the composite cathode active material of the present disclosure are hereinafter described in detail.

A. Method for Producing Composite Cathode Active Material

The method for producing a composite cathode active, material of the present disclosure comprises a coating step of, with a Li ion conductive oxide, coating a cathode active material that is a spinel type oxide including at least a Mn having a valence of +4 to obtain a coated cathode active material; and a heat treating step of heat treating the coated cathode active material to obtain a composite cathode active material, wherein a valence of the Mn in the coated cathode active material is lower than a valence of the Mn in the cathode active material before coating, and a valence of the Mn is increased by the heat treating.

Figure 1A:
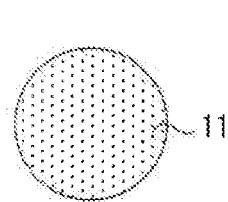
FIGS. 1A to 1C are schematic process drawings illustrating an example of the method for producing the composite cathode active material of the present disclosure.
Figure 1B:
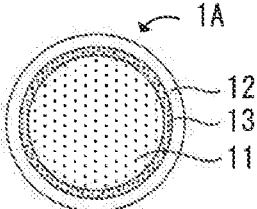
Figure 1C:
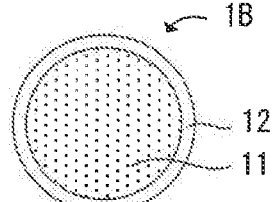
Figure 2A:
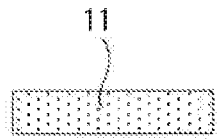
FIGS. 2A to 2C are schematic process drawings illustrating additional example of the method for producing the composite cathode active material of the present disclosure.
Figure 2B:
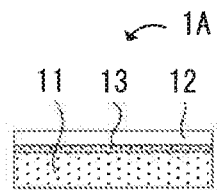
Figure 2C:
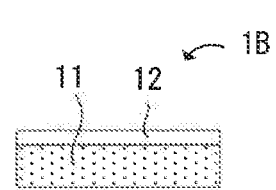

FIGS. 1A to 1C are schematic process drawings illustrating an example of the method for producing the composite cathode active material of the present disclosure. In the present disclosure, as shown in FIGS. 1A and 1B, coated cathode active material 1A is obtained by coating cathode active material 11, that is a spinel type oxide including at least a Mn having a valence of +4, with Li ion conductive oxide 12 (coating step). In the coating step, the valence of the Mn in cathode active material 11 is decreased when coated cathode active material 1A is fabricated. Accordingly, the valence of the Mn in coated cathode active material 1A is lower than the valence of the Mn in the cathode active material 11 before coating. In coated cathode active material 1A, for example, Mn-valent decreasing component 13 is generated on the surface of cathode active material 11. Next, as shown in FIGS. 1B and 1C, coated cathode active material 1A is heat treated to obtain composite cathode active material 1B (heat treating step). The heat treating step is a step of increasing the valence of a Mn by heat treating. In the heat treating step, for example, the valence of the Mn in coated cathode active material 1A may be restored to the valence of the Mn in cathode active material 11 before coating. Also, for example, Mn-valent decreasing component 13 is removed from the surface of cathode active material 11 by increasing the valence of the Mn. Incidentally, in FIGS. 1A to 1C, cathode active material 11 in a granular shape is exemplified; however, for example, cathode active material 11 may be in a thin film shape as shown in FIGS. 2A to 2C.

According to the present disclosure, a composite cathode active material with increased valence of the Mn may be obtained by heat treating the coated cathode active material with decreased valence of the Mn in the coating step. Thereby, a composite cathode active material with low reaction resistance may be obtained. The reason therefor is presumably because the Mn-valent decreasing component that is a resistance component in the coated cathode active material may be removed by heat treating.

As described above, when the cathode active material, that is a spinel type oxide including at least a Mn having a valence of +4, is coated with a Li-containing oxide, the reaction resistance of the battery may not be sufficiently reduced (the reaction resistance may be large) in some cases, To solve this problem, the present inventor has thoroughly researched and found out that the reason why the reaction resistance is large is because the valence of the Mn in the cathode active material (especially on its surface) is decreased upon fabricating the coated cathode active material. It is considered that the Mn-valent decreasing component generated by the decrease of the valence of the Mn becomes a resistance component and interferes the above described electrode reaction of the cathode active material.

With the knowledge, the present inventor has further thoroughly researched and surprisingly, found out that heat treating the coated cathode active material with decreased valence of the Mn allows the valence of the Mn to increase and to be restored to the valence of the Mn in the cathode active material before coating, and thus allows the reaction resistance to be reduced. It is considered that the heat treating allows the Mn-valent decreasing component to be removed so as to reduce the reaction resistance.

In the cathode active material that is a spinel type oxide including at least a Mn having a valence of +4, the reason of the decrease in the valent of the Mn in the coated cathode active material is presumed as follows. That is, when the cathode active material is coated with a Li ion conductive oxide, the Li ion conductive oxide or its precursor reacts with the cathode active material, and thus Li in the crystal structure is partially released, and for example, a component such as a manganese oxide including a Mn having a valence of +2 or +3 is presumably generated thereby.

Meanwhile, the reason of the increase in the valence of the Mn by heat treating is presumed as follows. That is, by the reaction of a coating layer with a component such as a manganese oxide, the Li ion is re-intercalated in the crystal structure, and the valence of the Mn presumably increases thereby.

Incidentally, in paragraph [0011] in Patent Literature 1, it is described that "It was found out that, when the polyanion structure portion and the transition metal on the surface of the cathode active material are brought into contact at a high temperature, the valence of the transition metal on the surface of the cathode active material is decreased compared with the valence of the transition metal in the cathode active material (bulk), and the interface resistance is increased by the presence of the region (transition metal reduction layer), in which the valence of the transition metal decreases." Patent Literature 1 discloses a technique of forming a reaction controlling portion (coating layer) in the cathode active material by a sol-gel method, and upon the heat treating, an alkoxide including carbon is further brought into contact, and heat treated. Carbon functions as a reducing agent. Accordingly, in Patent Literature 1, the coated cathode active material with decreased valence of the Mn is presumably obtained by the Mn being reduced due to carbon upon the heat treating. Also, Patent Literature 1 is a technique in which the conditions for the heat treating are limited for thinning the transition metal reduction layer with the decreased valence of the Mn; the technical idea of conducting heat treating for positively increasing the valence of the Mn as in the present disclosure is not at all disclosed. In other words, Patent Literature 1 does not discloses at all about the heat treating step in the present disclosure.

Also, as shown in the later described Reference Examples 3 and 4, for example, in the ternary oxide active materials such as $LiNi_{1/3}Co_{1/3}Mn_{1/3}O_2$, even when a coated cathode active material is fabricated by coating a cathode active material with a Li ion conductive oxide, the valence of the Mn in the coated cathode active material does not almost change from the valence of the Mn in the cathode active material before coating. Accordingly, the decrease in the valence of the Mn due to coating with a Li ion conductive oxide is a peculiar problem in the cathode active material that is a spinel type oxide including a Mn having a valence of +4.

The method for producing the composite cathode active material of the present disclosure is hereinafter described in each step.

1. Coating Step

The coating step in the present disclosure is a step with a Li ion conductive oxide, coating a cathode active material that is a spinel type oxide including at least a Mn having a valence of +4, to obtain a coated cathode active material.

(1) Cathode Active Material

The cathode active material in the present disclosure is a spinel type oxide including at least a Mn having a valence of +4. The cathode active material may include only a Mn having a valence of +4, and may further include a Mn having a valence other than +4. Above all, the cathode active material preferably includes the Mn having a valence of +4 mainly. The proportion of the Mn having a valence of +4 with respect to all the Mn in the cathode active material is, for example, preferably 70 mol % or more, and more preferably 90 mol % or more. Also, the proportion of the Mn having a valent of +4 is particularly preferably 100 mol %. The proportion of the Mn having a valence of +4 may be, for example, measured by the later described XAFS measurement.

The cathode active material in the present disclosure contains Mn as a cation, and usually further contains Li. Also, the cathode active material may, as a cation, for example, further contain at least one of Ni, Co, Cu, Fe, and Cr. In the present disclosure, it is preferable that the cathode active material contains at least one of Ni and Co among them.

The cathode active material in the present disclosure may be, for example, represented by $LiMe_xMn_{2-x}O_4$, in which Me is at least one of Ni, Co, Cu, Fe, and Cr, and $0 \le x < 2$. The value of x in the formula is usually 0 or more, may be larger than 0, may be 0.3 or more, and may be 0.5 or more. Also, the value of x is usually smaller than 2, and may be 1 or less. Above all, in the present disclosure, it is preferable that $LiNi_xMn_{2-x}O_4$, in which $0.3 \le x \le 1$.

Specific examples of the cathode active material may include $LiNi_{0.5}Mn_{1.5}O_4$, $LiCoMnO_4$, $LiCu_{0.5}Mn_{1.5}O_4$, $LiFeMnO_4$, and $LiCrMnO_4$.

Whether the cathode active material has a spinel structure or not may be confirmed by an X-ray structure analysis (XRD) measurement for example.

The cathode active material in the present disclosure is preferably a high voltage cathode active material. The charge potential of the cathode active material in the present disclosure is, to a Li metal potential, preferably 4.5 V or more, preferably 4.55 V or more in specific, and particularly preferably 4.6 V or more.

An example of the shape of the cathode active material may be a granular shape as in FIG. 1A. The average particle size ($D_{50}$) of the particle is, for example, preferably in a range of 0.1 μm to 50 μm. Additional example of the shape of the cathode active material may be a thin film shape. The thickness of the thin film is, for example, preferably in a range of 10 nm to 1 μm.

(2) Li Ion Conductive Oxide

The Li ion conductive oxide in the present disclosure is to coat the cathode active material.

In the composite cathode active material to be obtained by the present disclosure, the Li ion conductive oxide may, for example, inhibit the contact of the cathode active material with the solid electrolyte and inhibit the both from reacting. The Li ion conductive oxide is, for example, preferably a layer that coats the surface of the cathode active material (coating layer).

The Li ion conductive oxide an oxide having Li ion conductivity, and examples thereof may include an oxide represented by $Li_xAO_y$ (provided that A is at least one of B, C, Al, Si, P, S, Ti, Zr, Nb, Mo, Ta, and W, and x and y are respectively a positive number). Examples of the Li ion conductive oxide may include a polyanion structure-containing oxide having a polyanion structure comprising a plurality of oxygen elements and a covalent bonding central element thereto (such as $PO_4^{3-}$, $SiO_4^{4-}$, $GeO_4^{4-}$, and $BO_3^{3-}$).

Specific examples of the Li ion conductive oxide may include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. Above all, $Li_4SiO_4$ and $Li_3PO_4$ are preferable.

The average thickness of the Li ion conductive oxide to be coated on the cathode active material is, for example, preferably in a range of 1 nm to 50 nm, preferably in a range of 3 nm to 40 nm in specific, and particularly preferably in a range of 5 nm to 30 nm. If the average thickness of the Li ion conductive oxide is too thin, inhibiting the reaction of the cathode active material with the solid electrolyte may possibly be difficult. Also, if the average thickness of the Li ion conductive oxide is too thick, the ion conductivity may possibly be decreased. The average thickness of the Li ion conductive oxide may be, for example, measured by a transmission electron microscope (TEM).

(3) Coated Cathode Active Material

The coated cathode active material to be obtained by the coating step has the Mn having a valence lower than that in the cathode active material before coating. An XAFS (X-ray Absorption Fine Structure) measurement may, for example, allow the confirmation of the valence of the Mn in the coated cathode active material being lower than that in the cathode active material before coating. In the present disclosure, for example, the valence of the Mn on the surface of the cathode active material in the coated cathode active material is preferably lower than the valence of the Mn on the surface of the cathode active material before coating.

In the present disclosure, in an XAFS measurement, when a rate of a spectrum intensity I of 641.5 eV ($Mn^{3+}$) with respect to a spectrum intensity I of 643 eV ($Mn^{4+}$) is regarded as $I(Mn^{3+})/I(Mn^{4+})$, the value of $I(Mn^{3+})/I(Mn^{4+})$ in the coated cathode active material may be, for example, 1.38 times or more of the value of $I(Mn^{3+})/I(Mn^{4+})$ in the cathode active material before coating, and may be, for example, 1.45 times or more. Also, the value of $I(Mn^{3+})/I(Mn^{4+})$ in the coated cathode active material may be, for example, 2 times or less of the value of $I(Mn^{3+})/I(Mn^{4+})$ in the cathode active material before coating. If the value of $I(Mn^{3+})/I(Mn^{4+})$ increases, it can be said that the valence of the Mn is decreased from +4 to +3 ($Mn^{4+} \rightarrow Mn^{3+}$).

Also, when a rate of a spectrum intensity I of 639.5 eV ($Mn^{2+}$) with respect to the $I(Mn^{4+})$ is regarded as $I(Mn^{2+})/I(Mn^{4+})$, the value of $I(Mn^{2+})/I(Mn^{4+})$ in the coated cathode active material may be, for example, 2.51 times or more of the value of $I(Mn^{2+})/I(Mn^{4+})$ in the cathode active material before coating, may be, for example, 4.87 times or more, and may be 5.28 times or more. The value of $I(Mn^{2+})/I(Mn^{4+})$ in the coated cathode active material may be, for example, 5.5 times or less of the value of $I(Mn^{2+})/I(Mn^{4+})$ in the cathode active material before coating. If the value of $I(Mn^{2+})/I(Mn^{4+})$ increases, it can be said that the valence of the Mn is decreased from +4 to +2 ($Mn^{+4} \rightarrow Mn^{+2}$).

Incidentally, the rate of change in $I(Mn^{3+})/I(Mn^{4+})$ and the rate of change in $I(Mn^{2+})/I(Mn^{4+})$ may be, for example, also considered as the increase rate of the Mn-valent decreasing component (decrease rate of the valence of the Mn).

Also, the value of $I(Mn^{3+})/I(Mn^{4+})$ in the coated cathode active mate al to be obtained by the coating step may be, for example, more than 0.5, may be 0.55 or more, and may be 0.584 or more. Also, the value of $I(Mn^{3+})/I(Mn^{4+})$ in the coated cathode active material may be, for example, 0.7 or less, and may be 0.612 or less. Also, the value of $I(Mn^{2+})/I(Mn^{4+})$ in the coated cathode active material may be, for example, more than 0.2, and may be 0.223 or more. Also, the value of $I(Mn^{2+})/I(Mn^{4+})$ in the coated cathode active material may be less than 0.5, and may be 0.433 or less.

(4) Coating Step

The method for forming the coated cathode active material is not limited if the method allows the cathode active material to be coated with a Li ion conductive oxide, and allows the coated cathode active material to be obtained thereby. The method for forming the coated cathode active material may be, for example, a gas phase method, may be a liquid-phase method, and may be a solid phase method. Also, the method for forming the coated cathode active material may be a method in which the valence of the Mn decreases upon coating the cathode active material with the Li ion conductive oxide, and may be a method in which the valence of the Mn decreases due to the procedure after coating the cathode active material with the Li ion conductive oxide, but the former is more preferable.

An example of the method for forming the coated cathode active material may be a sputtering method. The sputtering method is a method to adhere the Li ion conductive oxide to the cathode active material by a relatively high energy. Thus, Li in the crystal structure of the cathode active material is desorbed by the shock due to the adhesion of the Li ion conductive oxide, and the valence of the Mn may be decreased thereby. Examples of the sputtering method may include a barrel sputtering method, a magnetron sputtering method, a reactive sputtering method, a bipolar method, and an ion beam sputtering method. Above all, a barrel sputtering method is preferable.

Also, additional example of the method for forming the coated cathode active material may be a method of coating by mechanically mixing the cathode active material with powder Li ion conductive oxide. In this method, Li in the crystal structure of the cathode active material is desorbed by the shock due to the physical contact of the cathode active material with the Li ion conductive oxide, and the valence of the Mn may be decreased thereby. Examples of the method for mechanical mixing may include a mechanical milling method.

Additional example of the method for forming the coated cathode active material may be a complex method. The complex method is a method to obtain a Li ion conductive oxide by preparing a complex solution including a complex as the precursor of the Li ion conductive oxide, forming the coating layer on the cathode active material by coating thereof with the complex solution, and then removing moisture from the coating layer by drying thereof. In this method, Li is easily soluble in the complex solution, and thus the valence of the Mn may be decreased.

Additional example of the method for forming the coated cathode active material may be a sol-gel method. The sol-gel method is, for example, a method to obtain a Li ion conductive oxide by preparing a sol solution including an alkoxide as the precursor of the Li ion conductive oxide, forming a coating layer by coating the cathode active material with the sol-gel solution, and then heat treating thereof to promote the sol-gel reaction. In this method, carbon included in the alkoxide notions as a reducing agent, and thus the valence of the Mn may be decreased.

The method for forming the coated cathode active material is preferably the sputtering method among the methods described above. The reason therefor is to uniformly coat the cathode active material with the ion conductive oxide.

2. Heat Treating Step

The heat treating step in the present disclosure is a step of heat treating the coated cathode active material to obtain a composite cathode active material. The heat treating step is a step to increase the valence of the Mn by heat treating.

(1) Composite Cathode Active Material

The composite cathode active material to be obtained by the heat treating step has a valence of the Mn increased more than that of the coated cathode active material. The increase of the valence of the Mn in the composite cathode active material may be confirmed by, for example, an XAFS measurement. In the present disclosure, for example, the valence of the Mn on the surface of the cathode active material in the composite cathode active material is preferably increased more than the valence of the Mn on the surface of the coated cathode active material.

In the present disclosure, the value of $I(Mn^{3+})/I(Mn^{4+})$ in the composite cathode active material may be, for example, 68 times or less of the value of $I(Mn^{3+})/I(Mn^{4+})$ in the coated cathode active material. If the value of $I(Mn^{3+})/I(Mn^{4+})$ decreases, it can be said that the valence of the Mn increases from +3 to +4 ($Mn^{3+} \rightarrow Mn^{4+}$).

Also, in the present disclosure, the value of $I(Mn^{2+})/I(Mn^{4+})$ in the composite cathode active material may be, for example, 0.43 times or less of the value of $I(Mn^{2+})/I(Mn^{4+})$ in the coated cathode active material. If the value of $I(Mn^{2+})/I(Mn^{4+})$ decreases, it can be said that the valence of the Mn increases from +2 to +4 ($Mn^{2+} \rightarrow Mn^{4+}$).

Incidentally, the rate of change in $I(Mn^{3+})/I(Mn^{4+})$ and the rate of change in $I(Mn^{2+})/I(Mn^{4+})$ before and after heat treating may be, for example, also considered as the decrease rate of the Mn-valent decreasing component (increase rate of the valence of the Mn).

The valence of the Mn in the composite cathode active material is, for example, preferably equal to the valent of the Mn in the cathode active material before coating. The value of $I(Mn^{3+})/I(Mn^{4+})$ in the composite cathode active material may be 1.07 times or less of the value of $I(Mn^{3+})/I(Mn^{4+})$ in the cathode active material before coating, and may be 0.99 times or more. Also, the value of $I(Mn^{2+})/I(Mn^{4+})$ in the composite cathode active material may be, for example, 1.31 times or less of the value of $I(Mn^{2+})/I(Mn^{4+})$ in the cathode active material before coating, and may be 1.09 times or more.

Incidentally, the above described rate change in $I(Mn^{3+})/I(Mn^{4+})$ and rate of change in $I(Mn^{2+})/I(Mn^{4+})$ may be, for example, also considered as the return rate of the valence of the Mn.

The value of $I(Mn^{3+})/I(Mn^{4+})$ in the composite cathode active material to be obtained by the heat treating step is typically 0.40 or more, and more preferably 0.422 or more. Also, the $I(Mn^{3+})/I(Mn^{4+})$ is typically 0.50 or less, and more preferably 0.450 or less. Also, the value of $I(Mn^{2+})/I(Mn^{4+})$ in the composite cathode active material is typically 0.08 or more, preferably 0.085 or more, more preferably 0.089 or more, further preferably 0.095 or more, and particularly preferably 0.097 or more. Also, the $I(Mn^{2+})/I(Mn^{4+})$ is typically 0.12 or less, and preferably 0.117 or less. Above all, in the present disclosure, both $I(Mn^{3+})/I(Mn^{4+})$ and $I(Mn^{2+})/I(Mn^{4+})$ in the composite cathode active material preferably satisfy the above described value range. The Mn-valent decreasing component in the composite cathode active material may be reduced thereby.

(2) Heat Treating Step

The heat treating temperature and the heat treating time for the heat treating step are appropriately adjusted so as to increase the valence of the Mn. The heat treating temperature may be, for example, 400° C. or more, and may be 500° C. or more. Also, the heat treating temperature may be, for example, 650° C. or less, and may be 600° C. or less.

The heat treating time is, for example, preferably in a range of 10 minutes to 20 hours, and more preferably in a range of 1 hour to 8 hours.

The heat treating may be conducted in an atmosphere including at least oxygen (particularly air atmosphere), an inert gas atmosphere (such as an Ar gas atmosphere), a reduced pressure atmosphere, and a vacuum. In the present disclosure, the atmosphere including oxygen is preferable, and the air atmosphere is more preferable among them. The reason therefor is to inhibit the deterioration of the cathode active material. In a spinel type oxide including at least a Mn having a valence of +4, oxygen deficiency tends to occur in the cathode active material due to the heat treating; thus, the occurrence of oxygen deficiency may be presumably prevented by heat treating the cathode active material in the atmosphere including oxygen.

The method for the heat treating is not limited; for example, may be conducted using a burning furnace.

3. Composite Cathode Active Material

The composite cathode active material to be obtained by the present disclosure is a cathode active material coated with a Li ion conductive oxide. The composite cathode active material is, for example, preferably used for a solid battery. It means that the present disclosure may also provide a solid battery comprising a cathode active material layer, an anode active material layer, and a solid electrolyte layer formed between the cathode active material layer and the anode active material layer; and the cathode active material layer including the above described composite cathode active material. Also, in the solid battery, the cathode active material layer or the solid electrolyte layer preferably includes a sulfide solid electrolyte. The reason therefor is that an oxide solid electrolyte easily reacts with a sulfide solid electrolyte to generate a high resistance layer; thus, the use of the composite cathode active material to be obtained by the present disclosure may allow the decrease of the resistance in the solid battery The cathode active material layer usually contains the above described composite cathode active material, and may further contain a solid electrolyte, a binder, and a conductance assisting material as required. As the solid electrolyte, for example, a sulfide solid electrolyte is preferable, and examples thereof may include $Li_2S-P_2S_5$ (particularly $Li_3PS_4$) and $Li_{10}GeP_2S_2$. Examples of the conductance assisting material may include carbon materials such as acetylene black, and metal materials.

The solid electrolyte layer usually contains a solid electrolyte, and may further contain a binder as required. As the solid electrolyte, a sulfide solid electrolyte is preferable.

Also, the anode active material layer usually contains an anode active material, and may further contain a solid electrolyte, a binder, and a conductance assisting material as required. The anode active material is not limited, and examples thereof may include graphite. The solid battery usually further comprises a cathode current collector for collecting currents of the cathode active material layer and an anode current collector for collecting currents of the anode active material layer.

The solid battery may be a primary battery and may be a secondary battery, but among them, a secondary battery is preferable so as to be repeatedly charged and discharged and useful as a car-mounted battery, for example. Incidentally, the primary battery includes a usage of a secondary battery as a primary battery (for discharging just once after charging).

B. Composite Cathode Active Material

The composite cathode active material of the present disclosure comprises a cathode active material that is a spinel type oxide including at least a Mn having a valence of +4, and a Li ion conductive oxide that coats the cathode active material; wherein in an XAFS measurement, when a rate of a spectrum intensity I of 641.5 eV ($Mn^{3+}$) and a rate of a spectrum intensity I of 639.5 eV ($Mn^{2+}$) with respect to a spectrum intensity I of 643 eV ($Mn^{4+}$) are regarded as $I(Mn^{3+})/I(Mn^{4+})$ and $I(Mn^{2+})/I(Mn^{4+})$ respectively; the $I(Mn^{3+})/I(Mn^{4+})$ is in a range of 0.40 or more to 0.50 or less, and the $I(Mn^{2+})/I(Mn^{4+})$ is in a range of 0.08 or more to 0.12 or less. The composite cathode active material of the present disclosure may be, for example, in a granular shape as shown in FIG. 1C, and may be in a thin film shape as shown in FIG. 2C.

According to the present disclosure, the $I(Mn^{3+})/I(Mn^{4+})$ and the $I(Mn^{2+})/I(Mn^{4+})$ are in the above described value range, so as to allow the composite cathode active material with low reaction resistance. The reason therefor is presumed that the Mn-valent decreasing component which resistance component is few in the composite cathode active material in the value range.

The details of the composite cathode active material of the present disclosure may be in the same contents as those described in the section "A. Method for producing composite cathode active material" above; thus, the description herein is omitted.

Incidentally, the present disclosure is not limited to the above embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to Examples.

Example 1

Formation of Coating Layer on Cathode Active Material

A powder cathode active material ($LiNi_{0.5}Mn_{1.5}O_4$, from Nichia Corporation) was prepared, and the surface of the cathode active material was coated with a coating material ($Li_4SiO_4$ target, from Toshima Manufacturing Co., Ltd.) by a powder barrel sputtering method, so as the average thickness of the coating material became 10 nm. A coated cathode active material was obtained in the above manner.

Heat Treating

The cathode active material coated with the coating material (coated cathode active material) was heat treated at 600° C. for 5 hours in an air atmosphere. A composite cathode active material was obtained in the above steps.

Synthesis of Solid Electrolyte

Starting raw materials were $Li_2S$ (from Nippon Chemical Industrial Co., Ltd.) and $P_2S_5$ (from Sigma-Aldrich LLC.). Each of the starting raw materials was weighed so as to be $Li_2S:P_2S_5=75:25$ in a molar ratio, and mixed by an agate motor. After that, the mixture and the heptane were put in a container and subjected to mechanical milling for 40 hours using a planetary ball mill to obtain a solid electrolyte.

Fabrication of Electrode Mixture

The above described composite cathode active material 12 mg as a cathode active material, a conductive material carbon VGCF (from SHOWA DEKKO K. K) 1 mg, and the solid electrolyte 6 mg were weighed, and the mixture thereof was prepared as a cathode mixture.

Graphite 5 mg as an anode active material and the solid electrolyte 5 mg were weighed, and the mixture thereof was prepared as an anode mixture.

Fabrication of Solid Battery

The solid electrolyte of 100 mg was weighed in a 1 $cm^2$ mold made of ceramics and pressed at 1 ton/$cm^2$ ($10^3$ kg/$cm^2$) to fabricate a separating layer. The cathode mixture of 18 mg was put on one side of the obtained separating layer and pressed at 1 ton/$cm^2$ to fabricate a cathode. The anode mixture of 10 mg was put on the other side of the separating layer and pressed at 5 ton/$cm^2$ to fabricate an anode. Also, an aluminum foil was used as a cathode current collector, and a copper foil was used as an anode current collector. A solid battery was obtained in the above manner Example 2

A composite cathode active material and a solid battery were fabricated in the same manner as in Example 1, except that $Li_3PO_4$ target (from Toshima Manufacturing Co., Ltd,) was used as the coating material replacing $Li_3SiO_4$ target (from Toshima Manufacturing Co., Ltd.), and the heat treating temperature for the coated cathode active material was changed to 550° C.

Comparative Example 1

A solid battery was fabricated in the same manner as in Example 1, except that the heat treating step to obtain the composite cathode active material in Example 1 was not conducted; the coated cathode active material in Example 1 was used as it was.

Comparative Example 2

A solid battery was fabricated in the same manner as in Example 2, except that the heat treating step to obtain the composite cathode active material in Example 1 was not conducted; the ted cathode active material in Example 2 was used as it was.

Reference Example 1

A solid battery was fabricated in same manner as in Example 1, except that the coating material was not formed and a powder cathode active material ($LiNi_{0.5}Mn_{1.5}O_4$, from Nichia Corporation) not heat treated was used.

[Evaluation]

XAFS Measurement

An XAFS measurement was conducted for the composite cathode active materials in Examples 1 and 2, the coated cathode active materials in Comparative Examples, and the powder cathode active material in Reference Example 1. In order to obtain information in the vicinity of the surface of the active materials, as the detection signal, the whole electron yield was measured. From the obtained spectrums, a spectrum intensity I of 639.5 eV ($Mn^{2+}$) attributed to $Nn^{2+}$, a spectrum intensity I of 641.5 eV ($Mn^{3+}$) attributed to $Mn^{3+}$, and a spectrum intensity I of 643 eV ($Mn^{4+}$) attributed to $Mn^{4+}$ were used, and the rate of intensity $I(Mn^{2+})/I(Mn^{4+})$ and $I(Mn^{3+})/I(Mn^{4+})$ were calculated. The result is shown in Table 1, Also, the rate of change in $I(Mn^{2+})/I(Mn^{4+})$ and the rate of change in $I(Mn^{3+})/I(Mn^{4+})$ shown in Table 2 were calculated.

Reaction Resistance Measurement

The solid batteries in Reference Example 1, Comparative Example, and Examples 1 and 2 were charged and discharged at 25° C., 3.0 V to 5.0 V, and 0.15 mA 3 cycles, and then the SOC (State of Charge) was adjusted to 20%. An impedance measurement was conducted to calculate the reaction resistance. The result is shown in Table 3.

TABLE 1

| | Cathode active material | Coating material | Heat treating | $I(Mn^{3+})/I(Mn^{4+})$ | $I(Mn^{2+})/I(Mn^{4+})$ |
|---|---|---|---|---|---|
| Reference Example 1 | $LiNi_{0.5}Mn_{1.5}O_4$ | None | None | 0.422 | 0.089 |
| Comparative Example 1 | $LiNi_{0.5}Mn_{1.5}O_4$ | $Li_4SiO_4$ | None | 0.612 | 0.223 |
| Example 1 | $LiNi_{0.5}Mn_{1.5}O_4$ | $Li_4SiO_4$ | 600° C. | 0.418 | 0.097 |
| Comparative Example 2 | $LiNi_{0.5}Mn_{1.5}O_4$ | $Li_3PO_4$ | None | 0.675 | 0.470 |
| Example 2 | $LiNi_{0.5}Mn_{1.5}O_4$ | $Li_3PO_4$ | 550° C. | 0.450 | 0.117 |

TABLE 2

| | Rate of change in $I(Mn^{3+})/I(Mn^{4+})$ | Rate of change in $I(Mn^{2+})/I(Mn^{4+})$ |
|---|---|---|
| Comparative Example 1/ Reference Example 1 (Increase rate of Mn-valent decreasing component) | 1.45 | 2.51 |
| Example 1/Comparative Example 1 (Decrease rate of Mn-valent decreasing component) | 0.68 | 0.43 |
| Example 1/Reference Example 1 (Return rate of valence of Mn) | 0.99 | 1.09 |
| Comparative Example 2/ Reference Example 1 (Increase rate of Mn-valent decreasing component) | 1.60 | 5.28 |
| Example 2/Comparative Example 2 (Decrease rate of Mn-valent decreasing component) | 0.67 | 0.25 |
| Example 2/Reference Example 1 (Return rate of valence of Mn) | 1.07 | 1.31 |

TABLE 3

| | Cathode active material | Coating material | Heat treating | Reaction resistance (Ω) |
|---|---|---|---|---|
| Reference Example 1 | $LiNi_{0.5}Mn_{1.5}O_4$ | None | None | 8672 |
| Comparative Example 1 | $LiNi_{0.5}Mn_{1.5}O_4$ | $Li_4SiO_4$ | None | 555 |
| Example 1 | $LiNi_{0.5}Mn_{1.5}O_4$ | $Li_4SiO_4$ | 600° C. | 114 |
| Comparative Example 2 | $LiNi_{0.5}Mn_{1.5}O_4$ | $Li_3PO_4$ | None | 221 |
| Example 2 | $LiNi_{0.5}Mn_{1.5}O_4$ | $Li_3PO_4$ | 550° C. | 50 |

From the result of Reference Example 1, Comparative Example 1, and Comparative Example 2 in Tables 1 and 2, it was confirmed that the rate of change in $I(Mn^{3+})/I(Mn^{4+})$ which was the increase rate of the Mn-valent decreasing component was 1.45 (Comparative Example 1/Reference Example 1) and 1.60 (Comparative Example 2/Reference Example 1), and the rate of change in $I(Mn^{2+})/I(Mn^{4+})$ was 2.51 (Comparative Example 1/Reference Example 1) and 5.28 (Comparative Example 2/Reference Example 1). From the result, it was confirmed that the valence of the Mn in the vicinity of the surface of the coated cathode active material decreased to be less than the valence of the Mn in the cathode active material before coating, and the Mn-valent decreasing component was generated.

Also, from the result of Comparative Examples 1, 2, and Examples 1 and 2 shown in Tables 1 and 2, it was confirmed that the rate of change in $I(Mn^{3+})/I(Mn^{4+})$ which was the decrease rate of the Mn-valent decreasing component was 0.68 (Example 1/Comparative Example 1) and 0.67 (Example 2/Comparative Example 2), and the rate of change in $I(Mn^{2+})/I(Mn^{4+})$ was 0.43 (Example 1/Comparative Example 1) and 0.25 (Example 2/Comparative Example 2). From the result, it was confirmed that the valence of the Mn was increased by heat treating the coated cathode active material with decreased valence of the Mn.

Furthermore, from the result of Reference Example 1, Example 1, and Example 2 shown in Tables 1 and 2, it was confirmed that the rate of change in $I(Mn^{3+})/I(Mn^{4+})$ which was the return rate of the valence of the Mn was 0.99 and 1.07 respectively, and the rate of change in $I(Mn^{2+})/I(Mn^{4+})$ was 1.09 and 1.31 respectively. From the result, it was confirmed that the valence of the Mn decreased upon fabricating the coated cathode active material was returned to approximately the equivalent level of the valence of the Mn in the cathode active material before coating, by the heat treating.

It was confirmed that the value of $I(Mn^{3+})/I(Mn^{4+})$ in Examples 1, 2, and Reference Example 1 was all in the vicinity of 0.4, and the value of $I(Mn^{2+})/I(Mn^{4+})$ was all in the vicinity of 0.1. Meanwhile, the value of $I(Mn^{2+})/I(Mn^{4+})$ in Comparative Examples 1 and 2 was 0.223 and 0.470 respectively, and the value of $I(Mn^{3+})/I(Mn^{4+})$ was 0.612 and 0.675 respectively. From the result, it was confirmed that the Mn-valent decreasing component in the composite cathode active material was approximately as few as in the cathode active material before coating.

Also, the result of Reference Example 1, Comparative Examples 1, 2, and Examples 1 and 2 in Table 3 shows that the cathode active materials in Comparative Examples and Example 1 which were coated with the coating materials had smaller reaction resistance than that of the cathode active material in Reference Example, which was not coated with a coating material. The reason therefor is presumably the presence of the coating material prevents the reaction of the cathode active material with the solid electrolyte which produces a high resistance layer. On the other hand, it was confirmed that the reaction resistance in Examples 1 and 2 was approximately fifth to quarter of that in Comparative Examples 1 and 2. From the result, it was confirmed that the Mn-valent decreasing component was decreased by the heat treating, so that the reaction resistance was reduced.

Reference Example 2

A surface of a cathode active material was coated with $LiNbO_3$ using the complex method.

Hydrogen peroxide water of 30 weight % was put in a container, and ion exchanged water and niobic acid were added thereto. Next, ammonia water of 28 weight % was added to the container. The mixture was sufficiently stirred to obtain a solution. In addition, lithium hydroxide monohydrate was added to the solution to obtain a complex solution containing a peroxo complex of niobium, and lithium The complex solution obtained in the above manner was sprayed to the cathode active material using a tumbling fluidized bed granulating-coating machine (MP-01 from Powrex Corporation), and the surface of the cathode active material was coated with a layer including the precursor of lithium niobate. Moisture was removed therefrom by drying in a vacuum at 120° C. for 10 hours, and thereby an active material complex powder with lithium niobate adhered to the surface was obtained.

Reference Example 3

A coated cathode active material was obtained in the same manner as in Example 1, except that $LiNi_{1/3}Co_{1/3}Mn_{1/3}O_2$, was used as the cathode active material, and $LiNbO_3$ was used as the coating material.

Reference Example 4

$LiNi_{1/3}Co_{1/3}Mn_{1/3}O_2$ not coated with the coating material was used as the cathode active material in Reference Example 4.

[Evaluation]

An XAFS measurement was conducted for the coated active materials or cathode active material powder in Reference Examples 2 to 4. The result is shown in Table 4. Also, the rate of change in $I(Mn^{3+})/I(Mn^{4+})$ and the rate of change in $I(Mn^{2+})/I(Mn^{4+})$ shown in Table 5 were calculated,

TABLE 4

| | Cathode active material | Coating material | $I(Mn^{3+})/I(Mn^{4+})$ | $I(Mn^{2+})/I(Mn^{4+})$ |
|---|---|---|---|---|
| Reference Example 1 | $LiNi_{0.5}Mn_{1.5}O_4$ | None | 0.422 | 0.089 |
| Reference Example 2 | $LiNi_{0.5}Mn_{1.5}O_4$ | $LiNbO_3$ | 0.584 | 0.433 |
| Reference Example 3 | $LiNi_{1/3}Co_{1/3}Mn_{1/3}O_2$ | $LiNbO_3$ | 0.391 | 0.108 |
| Reference Example 4 | $LiNi_{1/3}Co_{1/3}Mn_{1/3}O_2$ | None | 0.383 | 0.106 |

TABLE 5

| | Rate of change in $I(Mn^{3+})/I(Mn^{4+})$ | Rate of change in $I(Mn^{2+})/I(Mn^{4+})$ |
|---|---|---|
| Reference Example 2/Reference Example 1 (Increase rate of Mn-valent decreasing component) | 1.38 | 4.87 |

TABLE 5-continued

| | Rate of change in $I(Mn^{3+})/I(Mn^{4+})$ | Rate of change in $I(Mn^{2+})/I(Mn^{4+})$ |
|---|---|---|
| Reference Example 3/Reference Example 4 (Increase rate of Mn-valent decreasing component) | 1.02 | 1.02 |

The values of $I(Mn^{3+})/I(Mn^{4+})$ and $I(Mn^{2+})/I(Mn^{4+})$ in Reference Example 2 were higher than those in Reference Example 1 and Example 1, and further higher than that in Comparative Example 1. Accordingly, it was confirmed that the valence of the Mn decreased also when the coated cathode active material was fabricated using the complex method.

The result of Reference Examples 3 and 4 showed that the values of $I(Mn^{3+})/I(Mn^{4+})$ and $I(Mn^{2+})/I(Mn^{4+})$ did not almost change from before to after fabricating the coated cathode active material when using $LiNi_{1/3}Co_{1/3}Mn_{1/3}O_2$ (ternary oxide active material) instead of $LiNi_{0.5}Mn_{1.5}O_4$ as the cathode active material. It means that, in ternary oxide active materials, it was confirmed that the valence of the Mn in the coated cathode active material did not almost change upon fabricating the coated cathode active material.

REFERENCE SIGNS LIST 11 cathode active material
12 Li ion conductive oxide
13 Mn-valent decreasing component
1A coated cathode active material
1B composite cathode active material

What is claimed is:

1. A method for producing a composite cathode active material, the method comprising:
   (1) a coating step of coating a cathode active material that is a spinel type oxide including at least a Mn having a valence of +4 with a Li ion conductive oxide to obtain a coated cathode active material, wherein a valence of the Mn in the coated cathode active material is lower than a valence of the Mn in the cathode active material before coating, and
   (2) a heat treating step of heat treating the coated cathode active material to obtain a composite cathode active material, wherein a valence of the Mn is increased by the heat treating; and in an XAFS measurement, when a rate of a spectrum intensity I of 641.5 eV ($Mn^{3+}$) with respect to a spectrum intensity I of 643 eV ($Mn^{4+}$) is regarded as $I(Mn^{3+})/I(Mn^{4+})$, in the heat treating step, the valence of the Mn is increased so that a value of $I(Mn^{3+})/I(Mn^{4+})$ in the composite cathode active material becomes 1.07 times or less of a value of $I(Mn^{3+})/I(Mn^{4+})$ in the cathode active material before coating.

2. A method for producing a composite cathode active material, the method comprising:
   (1) a coating step of coating a cathode active material that is a spinel type oxide including at least a Mn having a valence of +4 with a Li ion conductive oxide to obtain a coated cathode active material, wherein a valence of the Mn in the coated cathode active material is lower than a valence of the Mn in the cathode active material before coating, and
   (2) a heat treating step of heat treating the coated cathode active material to obtain a composite cathode active material, wherein a valence of the Mn is increased by the heat treating; and in an XAFS measurement, when a rate of a spectrum intensity I of 639.5 eV ($Mn^{2+}$) with respect to a spectrum intensity I of 643 eV ($Mn^{4+}$) is regarded as $I(Mn^{2+})/I(Mn^{4+})$, in the heat treating step, the valence of the Mn is increased so that a value of $I(Mn^{2+})/I(Mn^{4+})$ in the composite cathode active material becomes 1.31 times or less of a value of $I(Mn^{2+})/I(Mn^{4+})$ in the cathode active material before coating.

3. The method for producing a composite cathode active material according to claim 1 wherein the Li ion conductive oxide has a polyanion structure.

4. The method for producing a composite cathode active material according to claim 1, wherein a heat treating temperature in the heat treating step is 400° C. or more.

5. The method for producing a composite cathode active material according to claim 1, wherein the cathode active material is represented by $LiMe_xMn_{2-x}O_4$, in which Me is at least one of Ni, Co, Cu, Fe, and Cr, and $0 \leq x < 2$.

6. The method for producing a composite active material according to claim 1, wherein the cathode active material is $LiNi_{0.5}Mn_{1.5}O_4$, $LiCoMnO_4$, $LiCu_{0.5}Mn_{1.5}O_4$, $LiFeMnO_4$, or $LiCrMnO_4$.

7. The method for producing a composite cathode active material according to claim 1, wherein in an XAFS measurement, when a rate of a spectrum intensity I of 639.5 eV ($Mn^{2+}$) with respect to a spectrum intensity I of 643 eV ($Mn^{4+}$) is regarded as $I(Mn^{2+})/I(Mn^{4+})$, in the heat treating step, the valence of the Mn is increased so that a value of $I(Mn^{2+})/I(Mn^{4+})$ in the composite cathode active material becomes 1.31 times or less of a value of $I(Mn^{2+})/I(Mn^{4+})$ in the cathode active material before coating.

8. The method for producing a composite cathode active material according to claim 1, wherein the coating step is carried out by a sputtering method, a mechanical mixing method, a complex method, or a sol-gel method.

9. The method for producing a composite cathode active material according to claim 8, wherein the method is a sputtering method.

10. The method for producing a composite cathode active material according to claim 2, wherein the Li ion conductive oxide has a polyanion structure.

11. The method for producing a composite cathode active material according to claim 2, wherein a heat treating temperature in the heat treating step is 400° C. or more.

12. The method for producing a composite cathode active material according to claim 2, wherein the cathode active material is represented by $LiMe_xMn_{2-x}O_4$, in which Me is at least one of Ni, Co, Cu, Fe, and Cr, and $0 \leq x < 2$.

13. The method for producing a composite cathode active material according to claim 2, wherein the cathode active material is $LiNi_{0.5}Mn_{1.5}O_4$, $LiCoMnO_4$, $LiCu_{0.5}Mn_{1.5}O_4$, $LiFeMnO_4$, or $LiCrMnO_4$.

14. The method for producing a composite cathode active material according to claim 2, wherein the coating step is carried out by a sputtering method, a mechanical mixing method, a complex method, or a sol-gel method.

15. The method for producing a composite cathode active material according to claim 14, wherein the method is a sputtering method.

* * * * *